(12) United States Patent
Kanazawa et al.

(10) Patent No.: US 8,465,815 B2
(45) Date of Patent: Jun. 18, 2013

(54) RESIN-COATED METAL SHEET AND SEAMLESS CAN MADE THEREFROM

(75) Inventors: Seitaro Kanazawa, Yokohama (JP); Shigeya Takahashi, Yokohami (JP); Tomoko Haraguchi, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 13/147,765

(22) PCT Filed: Apr. 2, 2010

(86) PCT No.: PCT/JP2010/056059
§ 371 (c)(1),
(2), (4) Date: Aug. 3, 2011

(87) PCT Pub. No.: WO2010/116952
PCT Pub. Date: Oct. 14, 2010

(65) Prior Publication Data
US 2012/0018341 A1  Jan. 26, 2012

(30) Foreign Application Priority Data
Apr. 8, 2009  (JP) .................................. 2009-093986

(51) Int. Cl.
*B29D 22/00* (2006.01)

(52) U.S. Cl.
USPC ....... 428/35.6; 428/35.9; 525/444; 206/524.3

(58) Field of Classification Search
USPC ................ 428/35.8, 35.9, 212, 458; 525/444; 206/524.3
See application file for complete search history.

(56) References Cited

U.S. PATENT DOCUMENTS

| | | | | |
|---|---|---|---|---|
| 6,565,937 | B2 * | 5/2003 | Sato et al. | 428/35.9 |
| 8,268,422 | B2 * | 9/2012 | Sato et al. | 428/35.8 |
| 2001/0031327 | A1 * | 10/2001 | Sato et al. | 428/35.8 |
| 2003/0039778 | A1 * | 2/2003 | Sato et al. | 428/35.7 |
| 2008/0241448 | A1 * | 10/2008 | Sato et al. | 428/35.8 |
| 2010/0021749 | A1 * | 1/2010 | Funagi et al. | 428/458 |
| 2011/0244158 | A1 * | 10/2011 | Murakami et al. | 428/35.8 |
| 2012/0018341 | A1 * | 1/2012 | Kanazawa et al. | 206/524.3 |

FOREIGN PATENT DOCUMENTS

| | | |
|---|---|---|
| EP | 2 085 441 A1 | 8/2009 |
| JP | 10-324754 A | 12/1998 |
| JP | 11-216826 A | 8/1999 |
| JP | 2001-246695 A | 9/2001 |
| WO | 2008/117694 A1 | 10/2008 |

* cited by examiner

*Primary Examiner* — N. Edwards
(74) *Attorney, Agent, or Firm* — Sughrue Mion, PLLC

(57) ABSTRACT

[Problems]
To provide a resin-coated metal sheet that exhibits excellent trimming property at the time of being formed into a seamless can, and is capable of providing a seamless can that closely adheres to the printing ink and exhibits excellent abrasion resistance.

[Means for Solution]
A resin-coated metal sheet including a metal sheet and a layer of a polyester resin which chiefly comprises an ethylene terephthalate unit formed on at least one surface of the metal sheet, wherein the polyester resin is a blend of a lowly crystalline polyester resin and a highly crystalline polyester resin.

5 Claims, No Drawings

RESIN-COATED METAL SHEET AND SEAMLESS CAN MADE THEREFROM

TECHNICAL FIELD

This invention relates to a resin-coated metal sheet and to a seamless can made from the resin-coated metal sheet. More specifically, the invention relates to a resin-coated metal sheet having excellent trimming property, abrasion resistance and close adhesion to the printing ink, and to a seamless can.

BACKGROUND ART

There has heretofore been known a seamless can (can having no seam on the side surface) formed by subjecting a resin-coated metal sheet to the draw working, bend-elongation working (stretch working) and/or ironing working, the resin-coated metal sheet being the metal sheet such as aluminum plate, tin plate or tin-free steel plate coated with an organic film.

As methods of coating the seamless can with an organic film, further, there have been known a method of applying an organic coating material onto a can after it has been formed, and a method of laminating a resin film such as of a thermoplastic polyester on a metal sheet of before being formed into a can and use the resin-coated metal sheet.

To form a seamless can from the resin-coated metal sheet, it is necessary to satisfy such requirements as close adhesion of the resin coating during the working, shock resistance, flavor-retaining property and corrosion resistance. From the above standpoint, therefore, there has heretofore been used a resin-coated metal sheet that is coated with an isophthalic acid-containing polyethylene terephthalate (patent document 1).

In forming the seamless can, the ironing working is conducted and, thereafter, the trimming working is conducted to shear and cut an upper part of the can body portion by holding the can body portion with a can body inner cutter and a can body outer cutter that rotate, respectively. At the timing of the trimming working, it is required that the resin coating is well sheared and cut together with the metal sheet. At a lower portion of the can body portion, further, the can comes in contact with a conveyer guide or the cans come in contact with one another, and the resin coating on the outer surfaces is burred. In case the printing is made on the burred portion, the printed ink is peeled off as the burred portion undergoes the thermal shrinking, and appearance becomes defective (hereinafter, the phenomenon of ink peeling is often called "abrasion").

In recent years, further, the cans have been sold bearing a prize seal called "tack seal" that is stuck to the surface of the can body portion accompanied, however, by a problem in that the printed ink is peeled off at the time when the seal is removed and a problem in that a foamed ink that is used in an attempt to improve decorative effect on the outer surface is peeled off if the cans come in contact with each other or are rubbed by each other during the transit. Therefore, it has been desired to further improve the close adhesion of the printing ink.

PRIOR ART DOCUMENTS

Patent Documents

Patent document 1: JP-A-2001-246695

OUTLINE OF THE INVENTION

Problems that the Invention is to Solve

However, trimming property, abrasion resistance and close adhesion of the printing ink are dependent upon the conflicting properties of the resin coating, and it is difficult to satisfy all of these properties to a sufficient degree.

That is, the trimming working is effected just after, for example, the ironing working and, therefore, depending upon the cases, the can body portion is often heated at about 60° C. due to the heat of working. To favorably conduct the trimming work, therefore, it is desired that the resin coating is stretched and oriented to form crystals. Further, the above-mentioned burring on the outer resin coating occurs at a low position of the can body portion where the stretching degree of working is small and crystals are little formed by stretching and orientation. It is, therefore, desired to form the outer coating by using a highly crystalline resin that easily forms crystals upon stretching and orientation.

On the other hand, the close adhesion of the printing ink is such that the printing ink excellently adheres to the amorphous portion of the resin coating and poorly adheres to the crystalline portion thereof. Namely, the close adhesion decreases as the resin coating is more crystallized.

It is, therefore, an object of the present invention to provide a resin-coated metal sheet that exhibits excellent trimming property at the time of being formed into a seamless can, and is capable of providing a seamless can that closely adheres to the printing ink and exhibits excellent abrasion resistance.

Another object of the present invention is to provide a seamless can having excellent properties such as close adhesion to the printing ink, shock resistance, flavor-retaining property and corrosion resistance.

Means for Solving the Problems

According to the present invention, there is provided a resin-coated metal sheet including a metal sheet and a layer of a polyester resin which chiefly comprises an ethylene terephthalate unit formed on at least one surface of the metal sheet, wherein the polyester resin is a blend of a lowly crystalline polyester resin and a highly crystalline polyester resin.

In the resin-coated metal sheet of the invention, it is desired that:

1. The polyester resin which chiefly comprises the ethylene terephthalate unit contains an isophthalic acid in an amount of 5 to 13 mol %;
2. The highly crystalline polyester resin is a homopolyethylene terephthalate or a polyethylene terephthalate that contains the isophthalic acid in an amount of not larger than 3 mol %;
3. The lowly crystalline polyester resin is a polyethylene terephthalate that contains the isophthalic acid in an amount of 12 to 18 mol %;
4. The layer of the polyester resin which chiefly comprises the ethylene terephthalate unit is formed on the metal sheet via the polyester resin that contains the isophthalic acid in an amount of 10 to 18 mol %; and
5. The metal sheet is an aluminum sheet.

According to the present invention, further, there is provided a seamless can made from the resin-coated metal sheet.

In the seamless can of the invention, it is desired that the resin coating is an outer coating of the seamless can.

In the resin-coated metal sheet of the invention, an important feature resides in that the resin coating of the polyester resin chiefly comprising the ethylene terephthalate unit (hereinafter might called as "PET") and formed on at least one surface of the metal sheet is a blend of the lowly crystalline polyester resin and the highly crystalline polyester resin.

In the resin-coated metal sheet as described above, trimming property, abrasion resistance and close adhesion to the printing ink vary depending upon the crystallinity of the resin coating. For trimming property and abrasion resistance, it is desired that the crystalline portion exists much in the resin coating and for the close adhesion to the printing ink, it is desired that the amorphous portion exists much in the resin coating. According to the present invention, therefore, upon using a blend of the highly crystalline polyester resin and the lowly crystalline polyester resin, it is made possible to provide the resin-coated metal sheet satisfying all of the properties of trimming property, abrasion resistance and close adhesion to the printing ink.

In the invention, the highly crystalline polyester resin stands for a resin of which a minimum half crystallization time is in a range of 10 to 200 seconds as measured by the following measuring method while the lowly crystalline polyester resin stands for a resin of which a minimum half crystallization time is in a range of 300 to 1100 seconds, both of which being crystalline resins. If an amorphous resin is used, trimming property and abrasion resistance become poor. Therefore, the invention uses no amorphous resin.

(Measuring the Minimum Half Crystallization Time)

The resin pellets are maintained at 30° C., are quickly heated by using a differential scanning calorimeter (DSC) up to 290° C. at a temperature elevating rate of 100° C./min., maintained at 290° C. for 3 minutes and are, thereafter, quenched down to 0° C. at a cooling rate of 100° C./min. Thereafter, the temperature is elevated up to a predetermined temperature at a temperature elevating rate of 100° C./min., and the temperature is maintained constant to obtain an "endothermic amount—sustenance time curve". The time at which the endothermic amount becomes a peak on the "endothermic amount—sustenance time curve" is defined as the "half crystallization time". This is measured at temperatures between 100° C. and 200° C., and a value of the smallest "half crystallization time" is regarded as the "minimum half crystallization time".

In the resin-coated metal sheet of the invention, it is desired that the resin coating is a polyester resin chiefly comprising an ethylene terephthalate unit containing isophthalic acid in an amount of 5 to 13 mol % and, more desirably, 6 to 12 mol %. In the invention, it is important that the amount of the isophthalic acid lies in the above range in the blend of the lowly crystalline polyester resin and the highly crystalline polyester resin. Even if the amount of the isophthalic acid is 5 to 13 mol %, desired objects of the invention are not attained if a copolymerized polyethylene terephthalate is used as will become obvious from the results of Examples appearing later.

Effects of the Invention

According to the present invention, it is made possible to provide a resin-coated metal sheet capable of satisfying all of trimming property, abrasion resistance and close adhesion to the printing ink which are conflicting properties without using any particular polyester resin.

When the resin-coated metal sheet of the invention is applied to a metal sheet that is relatively soft and has poor trimming property like aluminum sheet, the trimming property can be particularly improved.

Further, the seamless can of the invention has excellent formability and excellently close adhesion to the printing ink. Therefore, the printing ink is not peeled off even if a tack seal is stuck. Even if a foamed ink is used, further, the printed ink is effectively prevented from being peeled off.

MODE FOR CARRYING OUT THE INVENTION (Highly Crystalline Polyester Resin)

The highly crystalline polyester resin used in the invention is a polyester resin having a minimum half crystallization time in a range of 10 to 200 seconds and, particularly, 30 to 100 seconds as described above. If the minimum half crystallization time is shorter than the above range, the blended resin becomes so hard that the close adhesion to the printing ink may not be sufficiently improved. If the minimum half crystallization time is longer than the above range, on the other hand, the blended resin lacks crystallinity, and trimming property and abrasion resistance may not be sufficiently improved.

In the invention, it is important that the minimum half crystallization time lies in the above range, not less than 80 mol % and, particularly, not less than 90 mol % of the aromatic carboxylic acid component is a terephthalic acid component, and not less than 80 mol % and, particularly, not less than 90 mol % of the alcohol component is a polyester comprising an ethylene glycol. So far as the above conditions are satisfied, the polyester may be a homopolyester, a copolymerized polyester or may be a blend of two or more kinds of these resins.

As the carboxylic acid component other than the terephthalic acid component, there can be exemplified isophthalic acid, naphthalenedicarboxylic acid, p-β-oxyethoxybenzoic acid, biphenyl-4,4'-dicarboxylic acid, diphenoxyethane-4,4'-dicarboxylic acid, 5-sodiumsulfoisophthalic acid, hexahydroterephthalic acid, adipic acid, sebacic acid, trimellitic acid, pyromellitic acid, hemimellitic acid, 1,1,2,2-ethanetetracarboxylic acid, 1,1,2-ethanetricarboxylic acid, 1,3,5-pentanetricarboxylic acid, 1,2,3,4-cyclopentanetetracarboxylic acid, biphenyl-3,4,3',4'-tetracarboxylic acid and dimeric acid. It is, particularly, desired that the isophthalic acid is contained.

As the alcohol component other than the ethylene glycol, there can be exemplified such alcohol components as propylene glycol, 1,4-butanediol, neopentyl glycol, 1,6-hexylene glycol, diethylene glycol, triethylene glycol, cyclohexanedimethanol, bisphenol A ethylene oxide adduct, glycerol, trimethylolpropane, pentaerythritol, dipentaerythritol and sorbitan.

The polyester should have a molecular weight in a range of forming film, and an intrinsic viscosity (IV) of not less than 0.55 dL/g and, particularly, in a range of 0.6 to 1.0 dL/g as measured by using a phenol/tetrachloroethane mixed solvent as a solvent from the standpoint of barrier property against corrosive components and mechanical properties.

In the invention, in particular, there can be preferably used a homopolyethylene terephthalate or a polyethylene terephthalate containing not more than 3 mol % of isophthalic acid.

(Lowly Crystalline Polyester Resin)

The lowly crystalline polyester resin used in the invention is a polyester resin having a minimum half crystallization time in a range of 300 to 1100 seconds and, particularly, 500 to 1000 seconds as described above. If the minimum half crystallization time is shorter than the above range, the blended resin contains decreased amorphous portion and the close adhesion to the printing ink may not be sufficiently improved. Further, when the blended resin is directly adhered on the metal surface, adhesion to the metal so lacks that the resin may be removed from the end of flange of the can body portion. If the minimum half crystallization time is longer than the above range, on the other hand, the blended resin lacks crystallinity, and trimming property and abrasion resistance may not be sufficiently improved.

In the invention, it is important that the minimum half crystallization time lies in the above range, not less than 70 mol % of the aromatic carboxylic acid component is a terephthalic acid component, and not less than 70 mol % of the alcohol component is a polyester comprising an ethylene glycol. So far as the above conditions are satisfied, the polyester may be a copolymerized polyester or a blend of two or more kinds thereof.

Other copolymer components that can be added to the lowly crystalline polyester resin are the same as those exemplified above for the highly crystalline polyester resin.

In the invention, in particular, a polyethylene terephthalate containing 12 to 18 mol % of isophthalic acid can be preferably used.

(Blended Resin of Highly Crystalline Polyester Resin and Lowly Crystalline Polyester Resin)

In the present invention, it is desired to use the highly crystalline polyester resin and the lowly crystalline polyester resin at a weight ratio of 90:10 to 10:90 and, particularly, 75:25 to 25:75 from the standpoint of satisfying all of trimming property, abrasion resistance and close adhesion to the printing ink.

It is, further, desired that the blended resin contains the dimeric acid in an amount of 1 to 7 mol % of the dicarboxylic aid component in the whole blended resin. This makes it possible to improve close adhesion of the resin during the working and close adhesion to the printing ink. The dimeric acid can be added as a component copolymerizable with both or either one of the highly crystalline polyester resin and the lowly crystalline polyester resin.

The blended resin of the highly crystalline polyester resin and the lowly crystalline polyester resin can be, further, blended with known blending agents for resins, such as antiblocking agent like amorphous silica, pigment like titanium dioxide (titanium white), body, antioxidant like tocopherol (vitamine E), stabilizer, various antistatic agents and lubricant according to a known recipe.

The highly crystalline polyester resin and the lowly crystalline polyester resin can be blended together by dry blending or melt blending. In the former case, the resins are mixed together by using a blender, Henschel's mixer or super-mixer and are directly fed into a hopper of an extruder. In the latter case, the resins are kneaded together by using a mono-axial or bi-axial extruder, kneader or Bumbury's mixer.

(Metal Sheet)

In the present invention, various kinds of surface-treated steel sheets or light metal sheets such as of aluminum can be used as metal sheets on which a resin comprising the above blended resin is to be laminated.

As the surface-treated steel sheet, there can be exemplified a steel sheet obtained by subjecting a cold-rolled steel sheet after it is annealed to the temper rolling or the secondary cold rolling, such as SR material or DR material of which the surfaces are subjected to one or two or more kinds of surface treatments, such as zinc plating, tin plating, nickel plating, electrolytic chromate treatment, chromic acid treatment or phosphoric acid treatment.

As the light metal sheet, there can be exemplified metal sheets such as pure aluminum sheet, aluminum alloy sheet, as well as the above metal sheets of which the surfaces are subjected to the inorganic surface treatments such as chromic phosphate treatment, zirconium phosphate treatment and phosphoric acid treatment or to the organic surface treatments using polyacrylic acid, phenolic acid, tannic acid, itaconic acid and phosphonic acid, and the metal sheets of which the surfaces are subjected to the organic/inorganic composite treatments combining them together. In particular, the organic/inorganic composite surface treatments are desired for attaining favorably close adhesion between the resin layer and the metal surface. Among them, the treatment combining the phenol resin treatment and the zirconium phosphate treatment is more desired.

The resin-coated metal sheet of the invention features particularly excellent trimming property, and is particularly useful when it is an aluminum sheet that is relatively soft and has poor trimming property.

The metal sheet has a thickness that varies depending upon the kind of the metal, use of the laminated material and the size thereof, and, usually, has a thickness of 0.10 to 0.50 mm. Of them, the surface-treated steel sheet has a thickness of 0.10 to 0.30 mm and a light metal sheet has a thickness of 0.15 to 0.40 mm.

When a film of the blend of the highly crystalline polyester resin and the lowly crystalline polyester resin is to be laminated on the metal sheet by the extrusion lamination method to obtain the resin-coated metal sheet of the invention, there is no need of particularly providing an adhesive primer on the metal sheet in advance. As desired, however, the adhesive primer may be provided thereon, as a matter of course.

The primer exhibits excellent adhesiveness to both the metal sheet and the polyester resin. A representative example of the primer coating material excelling in both close adhesion and corrosion resistance may be a phenolepoxy type coating material comprising a resol type phenolaldehyde resin derived from various phenols and formaldehydes and a bisphenol type epoxy resin and, particularly, a coating material that contains the phenol resin and the epoxy resin at a weight ratio of 50:50 to 5:95 and, particularly, 40:60 to 10:90. The adhesive primer layer is provided maintaining a thickness of, usually, 0.3 to 5 µm.

(Layer Constitution)

In the resin-coated metal sheet of the invention, the film comprising the blend of the highly crystalline polyester resin and the lowly crystalline polyester resin particularly excels in close adhesion to the printing ink, and is desirably provided on the surface of the metal sheet that becomes at least the outer surface of the can. The film comprising the blend of the highly crystalline polyester resin and the lowly crystalline polyester resin may be formed on both surfaces of the metal sheet, as a matter of course. There can be formed not only the film of a single-layer structure but also the film of a multi-layer structure comprising the blend of the highly crystalline polyester resin and the lowly crystalline polyester resin and another film.

Desirably, the two-layer constitution is employed having, as the upper layer, a film of the blend of the highly crystalline polyester resin and the lowly crystalline polyester resin, and another film as the lower layer. In this case, it is desired to form, as the lower layer, a layer comprising the polyester resin containing 10 to 18 mol % of isophthalic acid that excels in close adhesion of the film during the working and has excellent shock resistance. If the amount thereof is smaller than the above range, adhesion to the base metal member becomes insufficient and, therefore, the resin is often removed at the end of the flange portion. If the amount thereof is larger than the above range, trimming may often become defective.

The layer comprising the blend of the highly crystalline polyester resin and the lowly crystalline polyester resin has a thickness, desirably, in a range of 1 to 50 μm and, particularly, 5 to 30 μm.

(Method of Producing Resin-Coated Metal Sheet)

In the present invention, a coating comprising the blend of the highly crystalline polyester resin and the lowly crystalline polyester resin can be formed on the metal sheet by any means such as extrusion coating method, cast film heat adhesion method or biaxially stretched film heat adhesion method. In the case of the extrusion coating method, the highly crystalline polyester resin and the lowly crystalline polyester resin are dry-blended in a mixer, are directly fed into a hopper of an extruder, and the polyesters are extruded through a die, extruded in a molten state onto the metal sheet, and are heat-adhered thereto. In the case of the multi-layer resins, the resins are co-extruded by using extruders of a number corresponding to the kinds of the resins, and are extrusion-coated.

In the case of using a polyester film comprising the blend of the highly crystalline polyester resin and the lowly crystalline polyester resin, the film is the one formed by a T-die method or an inflation film-forming method. The film may be an unstretched film formed by a cast-forming method by quickly quenching the extruded film or a biaxially stretched film obtained by successively or simultaneously and biaxially stretching the film at a stretching temperature and thermally fixing the film after it has been stretched.

(Seamless Can and a Method of its Production)

A seamless can comprising the resin-coated metal sheet of the invention is produced by subjecting the resin-coated metal sheet to the conventional means such as the draw/redraw working, bend-elongation working (stretch working) based on the draw/redraw working, bend-elongation/ironing working based on the draw/redraw working, or draw/ironing working in a manner that the surface of the metal sheet coated with the blend of the highly crystalline polyester resin and the lowly crystalline polyester resin is at least on the outer surface side of the can.

The seamless can of the invention is produced by the above means. Desirably, however, the thickness of the side wall portion is decreased by the bend-elongation based the redrawing after the draw working and/or by the ironing working. A decrease of the thickness is such that as compared to the bottom portion, the side wall portion has a thickness decreased to 20 to 95% and, particularly, 30 to 85% of the thickness of the resin-coated metal sheet blank based on the bend-elongation working and/or the ironing working.

The can immediately after formed is subjected to the trimming working. The trimming working is to shear and cut the upper part of the can body portion by holding the can body portion by a can body inner cutter and a can body outer cutter that rotate respectively. After the trimming working, the can is subjected to at least one stage of heat treatment to remove residual distortion of the film caused by the working permitting a lubricant used for the working to volatilize from the surfaces. Further, the printing is effected by applying a printing ink onto the outer surface of the can body portion, a finishing varnish is applied onto the outer surface side thereof followed by baking and curing in a curing oven at 160 to 220° C. for 30 seconds to 15 minutes. The can after heat-treated is quickly cooled or left to cool and is, as desired, subjected to the necking of a one-stage or multi-stage shape based on the die-necking or to the necking of a smooth shape based on the rolling or die-necking, followed by flanging to obtain a seamless can body for wrap-seaming.

The seamless can of the invention may use a known heat-curable white coating, heat-curable ink or heat-curable finishing varnish which is applied onto the can body portion and is cured by being baked in a baking oven. The resin coating of the resin-coated metal sheet of the invention so excels in close adhesion to the ink that a favorably close adhesion is attained even when there is used a foamed ink or foamed varnish containing thermally expanding microcapsules, ultraviolet ray-curable white coating, ultraviolet ray-curable ink or ultraviolet ray-curable finishing varnish as the ink or varnish which, usually, poorly adheres to the underlayer.

EXAMPLES (Minimum Half Crystallization Time of the Resin Pellets Blended in the Outer Surface Layer)

Described below are minimum half crystallization times of the outer surface resin layers used in Examples and Comparative Examples.

(1) Homo PET resin pellets (abbreviated as "homo" in Table 1): 38 seconds
(2) Copolymerized PET resin pellets containing 2 mol % of isophthalic acid (abbreviated as "IA2" in Table 1): 70 seconds
(3) Copolymerized PET resin pellets containing 3 mol % of isophthalic acid (abbreviated as "IA3" in Table 1): 79 seconds
(4) Copolymerized PET resin pellets containing 10 mol % of isophthalic acid (abbreviated as "IA10" in Table 1): 384 seconds
(5) Copolymerized PET resin pellets containing 12 mol % of isophthalic acid (abbreviated as "IA12" in Table 1): 520 seconds
(6) Copolymerized PET resin pellets containing 15 mol % of isophthalic acid (abbreviated as "IA15" in Table 1): 642 seconds
(7) Copolymerized PET resin pellets containing 18 mol % of isophthalic acid (abbreviated as "IA18" in Table 1): 980 seconds
(8) Copolymerized PET resin pellets containing 30 mol % of isophthalic acid (abbreviated as "IA30" in Table 1): amorphous resin which possessed no minimum half crystallization time.

(Evaluating the Resin-Coated Seamless Cans)

The obtained resin-coated seamless cans were evaluated as follows:

(1) Close Adhesion to the Ink.

Close adhesion to the ink was evaluated by using the Du Pont impact tester.

The obtained resin-coated seamless can was cut open, and the can body portion was stretched flat to prepare a test piece. The obtained test piece was so set to the Du Pont impact tester that an impact core will hit the test piece at a position 90 mm above the ground portion, the inner surface of the test piece facing upward. The impact core weighed 300 g and its end assumed the shape of a ball of a diameter of ⅜ inches. The impact core was permitted to fall from a height of 50 mm so that the outer surface side of the test piece was curved outward.

A cellophane tape (manufactured by Nichiban Co.) was adhered to the outer surface side of the test piece after it was curved outward and was peeled off. This operation was repeated twice. Five seamless cans that were obtained were measured as described above each at two places. The total areas that were peeled off were evaluated on the following basis. ◯ and Δ represent permissible ranges.

○: Peeled area was less than 20%.

Δ: Peeled area was not less than 20% but was less than 40%.

X: Peeled area was not less than 40%.

(2) Trimming Property.

One hundred cups after the trimming working were all observed by eyes for their trimmed portions and were evaluated for their trimming property on the following basis. ○ and Δ represent permissible ranges.

○: There was no defective trimming.

Δ: The trimmed portions were cut and separated, but the outer surface resin was slightly extending beyond the trimmed portions on some cans.

X: The trimmed portions were not cut but remained adhered on some cans.

(3) Abrasion Resistance.

Fifty seamless cans that were obtained were observed by eyes for their abrasion at lower portions of the can bodies. The abrasion resistance was evaluated on the following basis. ○ and Δ represent permissible ranges.

○: There was no abrasion.

Δ: Abraded traces were observed, but a blue ink was covering the whole surfaces.

X: There was no blue ink on some portions due to the abrasion.

(4) Close Adhesion to the Resin.

Fifty seamless cans that were obtained were observed by eyes for there degree of peeling of the outer surface resin from the end of the flange, and the close adhesion between the outer surface resin and the metal surface was evaluated on the following basis. ○ and Δ represent permissible ranges.

○: There was no peeling.

Δ: The outer surface resin was slightly peeled but was still permissible.

X: The outer surface resin was obviously peeled.

(5) Overall Evaluation.

Based on the evaluations of the close adhesion to the ink, trimming property, abrasion resistance and close adhesion to the resin, the overall evaluation was rendered on the following basis. ○ and Δ represent permissible ranges.

◎: Evaluations were all "○".

○: There was one "Δ" evaluation without, however, any "X" evaluation.

Δ: There were two "Δ" evaluations without, however, any "X" evaluation.

X: There were three or more "Δ" evaluations or there was an "X" evaluation.

Example 1

Preparation of a Resin-Coated Metal Sheet

A resin-coated metal sheet was prepared by treating the inner and outer surfaces of a substrate or a JIS3004 aluminum alloy sheet of the shape of a coil having a thickness of 0.28 mm with chromic phosphate such that the amount of chromium was 20 mg/m$^2$ calculated as metal chromium, and heat-laminating an un-oriented film of a polyethylene terephthalate/isophthalate (PET/IA) copolymerized resin of specifications described below on both surfaces of the substrate.

The un-oriented film on the outer surface side of the can was prepared by introducing copolymerized PET resin pellets containing 2 mol % of isophthalic acid as the highly crystalline polyester resin and copolymerized PET resin pellets containing 15 mol % of isophthalic acid as the lowly crystalline polyester resin into a blender at a weight ratio of 54:46 to dry-blend them together, and the blend thereof was fed into a hopper of an extruder to obtain a blended resin of the surface layer containing 8 mol % of isophthalic acid in the whole surface layer. Further, copolymerized PET resin pellets containing 15 mol % of isophthalic acid were fed into a hopper of another extruder to prepare a resin of the lower layer. These resins were co-extruded through a T-die and, immediately after extruded, were cooled with a cooling roll to thereby prepare an un-oriented two-layer resin film, the surface layer being 4 μm thick and the lower layer 12 μm thick.

The un-oriented film on the inner surface side of the can was also prepared in the same manner. That is, there was prepared an un-oriented two-layer resin film, the surface layer thereof containing 5 mol % of isophthalic acid and 4 μm thick and the lower layer thereof containing 15 mol % of isophthalic acid and 12 μm thick.

Preparation of the Resin-Coated Seamless Can

The coil-shaped resin-coated metal sheet obtained above was punched into a disk which was then subjected to the draw working and, further, to the redraw/ironing working. Thereafter, the upper part of the can body portion was trimmed, the cup was heated to remove distortion of the resin caused by the forming and, thereafter, a blue heat-curable printing ink was solidly printed on the outer surface of the can body portion, and a heat-curable finishing varnish was applied thereon followed by baking in a baking oven at 200° C. for 40 seconds. Thereafter, the cup was subjected to the necking and flanging to prepare a resin-coated seamless can having a height of can of 122 mm and a volume of 350 ml. The punch possessed a diameter of 66 mm, and the total ironing ratio was 63%. A series of these steps and the conveyance among them were conducted by using a can production line.

Specifications of the outer surface resin and the evaluated results in Example 1 were as shown in Table 1.

Example 2

A resin-coated seamless can was prepared and evaluated in the same manner as in Example 1 but using, as the outer surface layer resin (blended resin), 77% by weight of the copolymerized PET resin pellets containing 2 mol % of isophthalic acid and 23% by weight of the copolymerized PET resin pellets containing 15 mol % of isophthalic acid so that the amount of the isophthalic acid was 5 mol % in the whole surface layer. Specifications of the outer surface resin and the evaluated results were as shown in Table 1.

Example 3

A resin-coated seamless can was prepared and evaluated in the same manner as in Example 1 but using, as the outer surface layer resin (blended resin), 15% by weight of the copolymerized PET resin pellets containing 2 mol % of isophthalic acid and 85% by weight of the copolymerized PET resin pellets containing 15 mol % of isophthalic acid so that the amount of the isophthalic acid was 13 mol % in the whole surface layer. Specifications of the outer surface resin and the evaluated results were as shown in Table 1.

Example 4

A resin-coated seamless can was prepared and evaluated in the same manner as in Example 1 but using, as the outer surface layer resin (blended resin), 47% by weight of the homo PET resin pellets and 53% by weight of the copolymerized PET resin pellets containing 15 mol % of isophthalic acid. Specifications of the outer surface resin and the evaluated results were as shown in Table 1.

Example 5

A resin-coated seamless can was prepared and evaluated in the same manner as in Example 1 but using, as the outer surface layer resin (blended resin), 58% by weight of the copolymerized PET resin pellets containing 3 mol % of isophthalic acid and 42% by weight of the copolymerized PET resin pellets containing 15 mol % of isophthalic acid. Specifications of the outer surface resin and the evaluated results were as shown in Table 1.

Example 6

A resin-coated seamless can was prepared and evaluated in the same manner as in Example 1 but using, as the outer surface layer resin (blended resin), 40% by weight of the copolymerized PET resin pellets containing 2 mol % of isophthalic acid and 60% by weight of the copolymerized PET resin pellets containing 12 mol % of isophthalic acid. Specifications of the outer surface resin and the evaluated results were as shown in Table 1.

Example 7

A resin-coated seamless can was prepared and evaluated in the same manner as in Example 1 but using, as the outer surface layer resin (blended resin), 63% by weight of the copolymerized PET resin pellets containing 2 mol % of isophthalic acid and 38% by weight of the copolymerized PET resin pellets containing 18 mol % of isophthalic acid. Specifications of the outer surface resin and the evaluated results were as shown in Table 1.

Example 8

A resin-coated seamless can was prepared and evaluated in the same manner as in Example 1 but using, as the outer lower layer resin, a copolymerized PET resin containing 10 mol % of isophthalic acid. Specifications of the outer surface resin and the evaluated results were as shown in Table 1.

Example 9

A resin-coated seamless can was prepared and evaluated in the same manner as in Example 1 but using, as the outer lower layer resin, a copolymerized PET resin containing 18 mol % of isophthalic acid. Specifications of the outer surface resin and the evaluated results were as shown in Table 1.

Example 10

A resin-coated seamless can was prepared and evaluated in the same manner as in Example 1 but using, as the outer surface resin, a single layer of the blended resin of the outer surface layer of Example 1 having a thickness of 16 µm. Specifications of the outer surface resin and the evaluated results were as shown in Table 1.

Comparative Example 1

A resin-coated seamless can was prepared and evaluated in the same manner as in Example 1 but using, as the outer lower layer resin, the copolymerized PET resin pellets to obtain a copolymerized PET resin of terephthalic acid/8 mol % of isophthaic acid. Specifications of the outer surface resin and the evaluated results were as shown in Table 1.

Comparative Example 2

A resin-coated seamless can was prepared and evaluated in the same manner as in Example 1 but using, as the outer surface layer resin (blended resin), 79% by weight of the copolymerized PET resin pellets containing 2 mol % of isophthalic acid and 21% by weight of the copolymerized PET resin pellets containing 30 mol % of isophthalic acid. Specifications of the outer surface resin and the evaluated results were as shown in Table 1.

TABLE 1

| | Outer surface layer resin (blended resin) | | | Outer surface lower layer |
|---|---|---|---|---|
| | Total IA amount | Highly crystalline resin (kind, blended amount %) | Lowly crystalline resin (kind, blended amount %) | resin (kind) |
| Ex. 1 | 8 | IA2, (54%) | IA15, (46%) | IA15 |
| Ex. 2 | 5 | IA2, (77%) | IA15, (23%) | ↑ |
| Ex. 3 | 13 | IA2, (15%) | IA15, (85%) | ↑ |
| Ex. 4 | 8 | homo (47%) | IA15, (53%) | ↑ |
| Ex. 5 | ↑ | IA3, (58%) | IA15, (42%) | ↑ |
| Ex. 6 | ↑ | IA2, (40%) | IA12, (60%) | ↑ |
| Ex. 7 | ↑ | IA2, (63%) | IA18, (38%) | ↑ |
| Ex. 8 | ↑ | IA2, (54%) | IA15, (46%) | IA10 |
| Ex. 9 | ↑ | ↑ | ↑ | IA18 |
| Ex. 10 | ↑ | ↑ | ↑ | none |
| Comp. Ex. 1 | ↑ | copolymerized IA8 | copolymerized IA8 | IA15 |
| Comp. Ex. 2 | ↑ | IA2, (79%) | IA30, (21%) | ↑ |

| | Evaluation | | | | |
|---|---|---|---|---|---|
| | Close adhesion to the ink | Trimming property | Abrasion resistance | Close adhesion to the resin | Total evaluation |
| Ex. 1 | ○ | ○ | ○ | ○ | ⊚ |
| Ex. 2 | Δ | ○ | ○ | ○ | ○ |
| Ex. 3 | ○ | Δ | Δ | ○ | Δ |
| Ex. 4 | ○ | ○ | ○ | ○ | ⊚ |

TABLE 1-continued

|         |   |   |   |   |   |
|---------|---|---|---|---|---|
| Ex. 5   | ○ | ○ | Δ | ○ | ○ |
| Ex. 6   | Δ | ○ | ○ | ○ | ○ |
| Ex. 7   | ○ | ○ | Δ | ○ | ○ |
| Ex. 8   | ○ | ○ | ○ | Δ | ○ |
| Ex. 9   | ○ | Δ | ○ | ○ | ○ |
| Ex. 10  | ○ | ○ | ○ | Δ | ○ |
| Comp. Ex. 1 | Δ | Δ | Δ | ○ | X |
| Comp. Ex. 2 | ○ | X | X | ○ | X |

INDUSTRIAL APPLICABILITY

The resin-coated metal sheet of the invention satisfies all of trimming property, abrasion resistance and close adhesion to the printing ink, and can be effectively used for forming seamless cans by draw/redraw working, bend-elongation working (stretch working) based on the draw/redraw working, bend-elongation/ironing working based on the draw/redraw working or by draw/ironing working.

Owing to its excellent trimming property, further, the invention can be suitably applied to a metal sheet that is relatively soft and has poor trimming property, such as aluminum sheet.

Further, the seamless can of the invention features excellent formability, close adhesion to the printing ink, and does not permit the printing ink to be peeled off even when a tack seal is stuck thereto. Further, even when a foamed ink is used, the printing ink is effectively prevented from being peeled off enabling the resin-coated seamless can to be used for being stuck with a prize seal and being printed with various kinds of inks.

The invention claimed is:

1. A resin-coated metal sheet including a metal sheet and a layer of a polyester resin coating the metal sheet, the polyester resin chiefly comprising an ethylene terephthalate unit formed on at least one surface of the metal sheet, wherein said polyester resin is a blended polyester resin comprising a blend of a lowly crystalline polyester resin and a highly crystalline polyester resin, wherein said highly crystalline polyester resin is a homopolyethylene terephthalate or a polyethylene terephthalate containing isophthalic acid in an amount of not larger than 3 mol %, and said lowly crystalline polyester resin is a polyethylene terephthalate containing isophthalic acid in an amount of 12 to 18 mol %.

2. The resin-coated metal sheet according to claim 1, wherein the blended polyester resin contains an isophthalic acid in an amount of 5 to 13 mol %.

3. The resin-coated metal sheet according to claim 1, further comprising a lower layer formed on at least one surface of said metal sheet, the surface layer comprising said blended polyester resin of a blend of said highly crystalline polyester resin and said lowly crystalline polyester resin, and said lower layer comprising a polyester resin containing the isophthalic acid in an amount of 10 to 18 mol %.

4. The resin-coated metal sheet according to claim 1, wherein said metal sheet is an aluminum sheet.

5. A seamless can made from the resin-coated metal sheet of claim 1, wherein the layer of the blended polyester resin comprising a blend of said highly crystalline polyester resin and said lowly crystalline polyester resin is an outer coating of the seamless can, and a printed layer is formed on said blended polyester resin layer.

* * * * *